(No Model.) 2 Sheets—Sheet 1.
W. W. GRISCOM.
MEANS FOR PROPELLING VEHICLES BY SECONDARY BATTERIES.
No. 408,231. Patented Aug. 6, 1889.
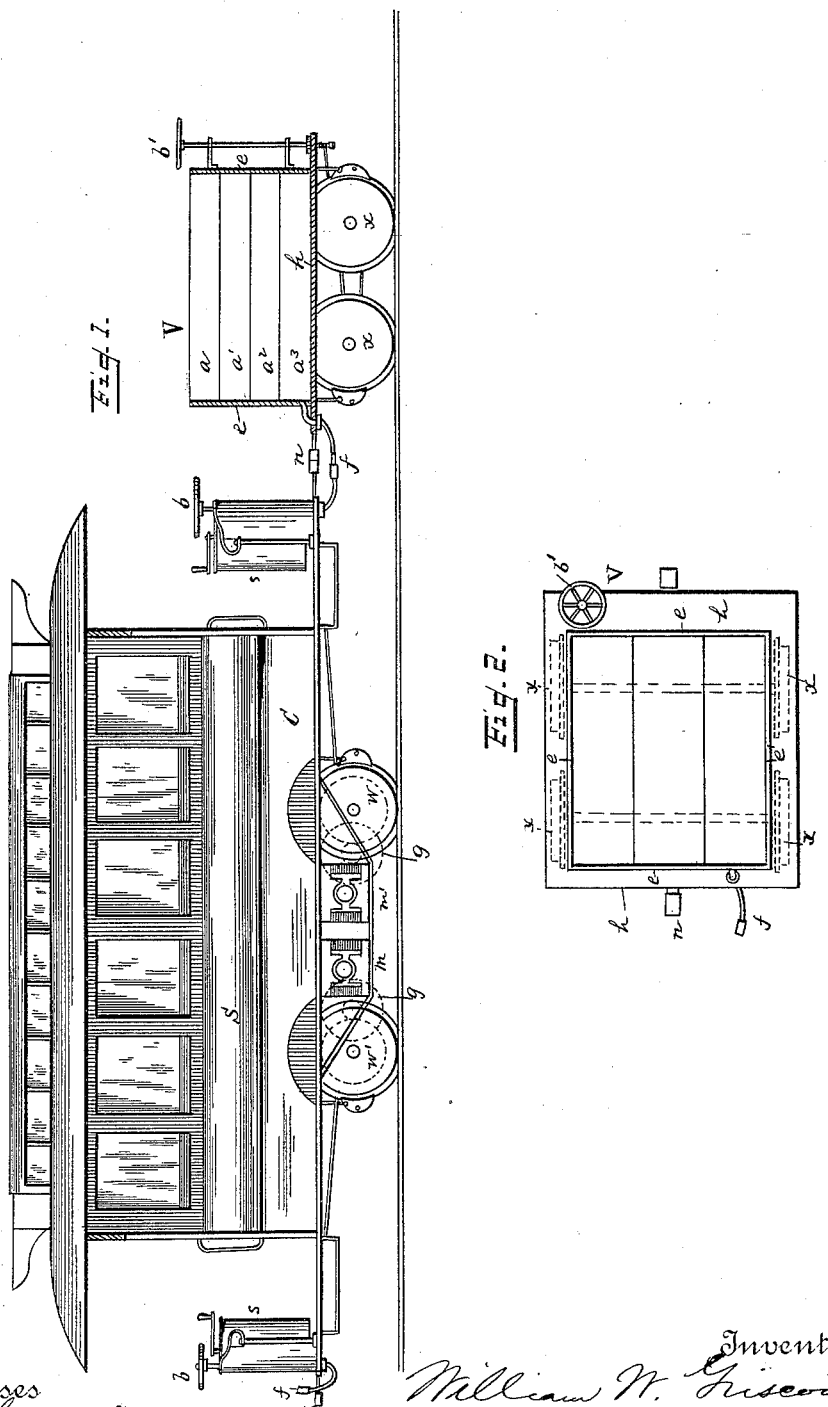

(No Model.) 2 Sheets—Sheet 2.
W. W. GRISCOM.
MEANS FOR PROPELLING VEHICLES BY SECONDARY BATTERIES.
No. 408,231. Patented Aug. 6, 1889.
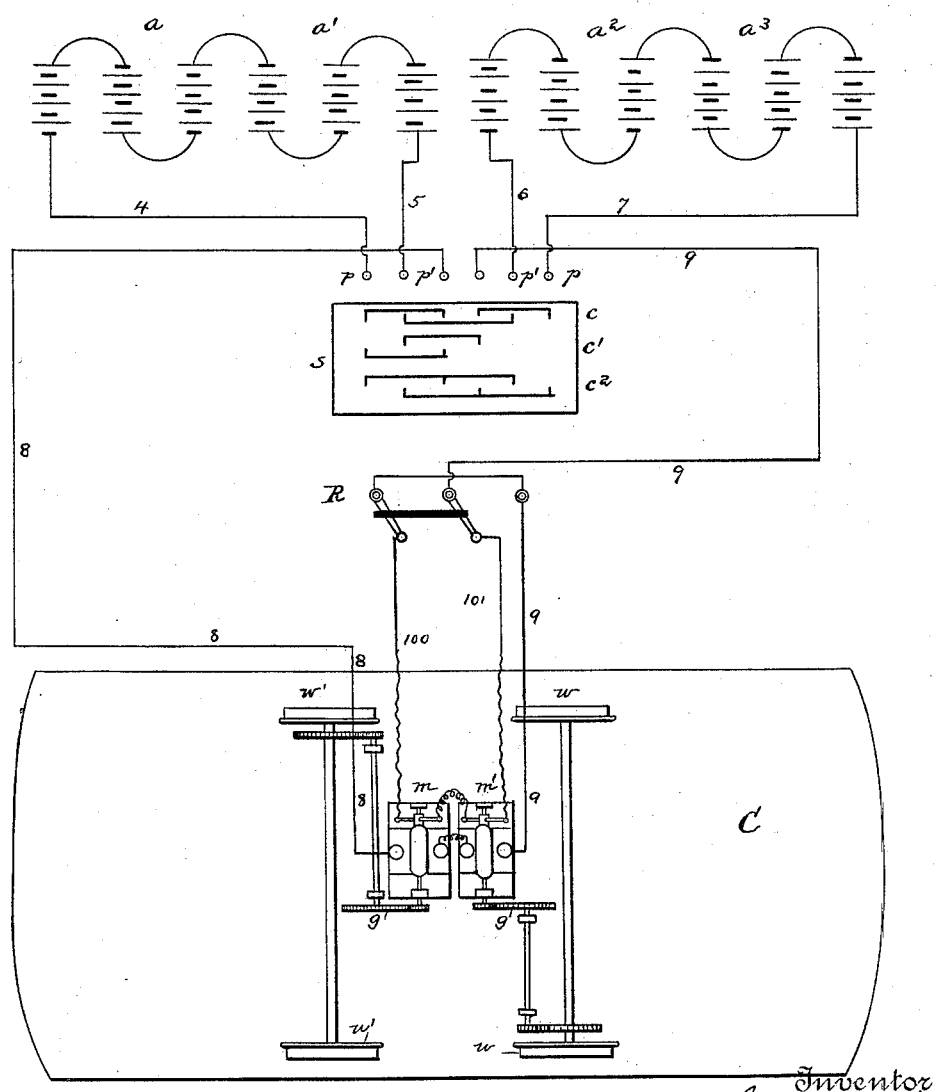

UNITED STATES PATENT OFFICE.

WILLIAM W. GRISCOM, OF HAVERFORD COLLEGE, ASSIGNOR TO THE ELECTRO DYNAMIC COMPANY, OF PHILADELPHIA, PENNSYLVANIA.

MEANS FOR PROPELLING VEHICLES BY SECONDARY BATTERIES.

SPECIFICATION forming part of Letters Patent No. 408,231, dated August 6, 1889.

Application filed April 5, 1889. Serial No. 306,114. (No model.)

*To all whom it may concern:*

Be it known that I, WILLIAM W. GRISCOM, a citizen of the United States, and a resident of Haverford College, in the county of Montgomery and State of Pennsylvania, have invented certain new and useful Improvements in the Means for Propelling Vehicles by Secondary Batteries, of which the following is a specification.

The invention is an improvement in the means for electrically propelling wheeled vehicles by secondary or other electric batteries.

The object of my invention is to avoid the defects in the arrangement of such apparatus at present known or used.

The electrical propulsion of vehicles is practiced under two general systems. In the first an electric motor on the moving vehicle must be kept in continuous electrical connection with a generator at a central point or generating-station. In the second each car carries its own source of electrical energy, either in the form of a chemical generator of electricity or in the form of a secondary or storage battery.

My invention is an improvement in the arragement of the latter class of apparatus.

Heretofore others have located one or more electric motors upon a wheeled vehicle designed to carry passengers, such as a street-car. The motors were mechanically connected with the wheels or axles and a series of cells of secondary battery were located upon said vehicle under the seats and electrically connected with the motors. A street-car is usually supplied with four wheels, furnishing four points of support. The great objection and the most serious defect encountered in the use of this arrangement of apparatus on such cars has been found in the excessive weight of the battery and motors, which, when added to a full load of passengers, exerts a crushing weight upon the tracks, which rapidly destroys them. To remedy this defect, cars have been equipped with two trucks of four wheels each; but this increases the expense to a point which is almost prohibitory, and in addition to this there has been the expense and labor of removing and replacing the batteries. A second arrangement of the same apparatus heretofore known and somewhat used consisted in placing the motors and batteries on a separate vehicle, and attaching to it, to be drawn thereby, a car or vehicle for passengers. While this is an improvement in some respects it is objectionable in others. This is open to all the objections urged against the first system; but the principal objection is that the friction between the locomotive wheels and rails (the tractive power) is always the same, whether a large load or a small load be carried, it being of course very desirable when the maximum load of passengers is carried that the tractive force should be at its maximum. A modification of this arrangement consists in placing the motors on a separate vehicle or locomotive designed to carry an engineer or driver, placing the batteries in a separate car or vehicle and attaching to both a car for passengers. This distributes the weight more uniformly over a series of points of support, but adds enormously to the expense of equipment, makes too long and cumbrous a train for street-railway purposes, and is most defective of all the enumerated arrangements in regard to the requirements for increasing the traction with increasing load.

My invention differs, essentially, from the arrangements heretofore known or used, and avoids entirely the objectionable features of each and all of them.

It consists in placing one or more motors upon a car or wheeled vehicle having seats for passengers, and mechanically connecting these motors with the wheels or axles in the usual manner. The batteries are placed upon a second four-wheeled vehicle, which is mechanically connected to the first vehicle and drawn thereby. The batteries on one vehicle are electrically connected to the motors on the other, and a switch for controlling the electrical connections is placed upon the first car. The passenger-car, loaded with its electric motors, has sufficient tractive power to draw its own weight and that of the second car carrying the batteries over the maximum grade. Now every passenger that enters the car adds weight to increase the friction between rails and wheels to the extent of the weight so added. The result is that the excessive weight due to the use of the batteries and motors is distributed over eight points of support instead of four. The friction between wheels and rails is increased with increase of load and decreased with decreasing load. The ease and expedition with which exhausted batteries are exchanged for charged batteries is greatly increased, and the expense of applying this arrangement of apparatus to the cars and road-beds in ordinary use is rendered feasible and practicable. The very important advantage, however, is the possibility of using two sets of batteries, one of which is being charged while the other is being used, and the facility in point of time and labor with which the change from one set to the other is made without jarring or injuring the batteries by handling them, whereby their useful life is greatly prolonged.

The accompanying drawings illustrate my invention.

Figure 1 shows the railway-car having electric motors thereon and a second wheeled vehicle connected thereto carrying the batteries. Fig. 2 is a plan view showing the superposed rows of batteries located on the floor inside the plane of the wheels. Fig. 3 is a diagrammatic view of the circuits, motors, and switching apparatus.

In Fig. 1 C is an ordinary street-car having longitudinally-arranged seats for passengers S and entrances for passengers from both ends. The running-gear consists of wheels $w\ w'$, located upon suitably-arranged axles. There are two electric motors $m$ and $m'$, supported under the car. These motors are mechanically connected with the wheels $w$ and $w'$, respectively, by suitable gearing $g\ g$. The car is equipped with the usual friction-brakes $b\ b$, located on opposite ends. There is also suitable switching apparatus $s$ on each end of the car, equipped with a suitable handle to manipulate it easily. The details of this switching apparatus are more fully shown in Fig. 3 to which reference will be made.

V is a second wheeled vehicle having four wheels $x\ x$, united in pairs by suitable axles. Its floor $h$ is a plane surface, and it is surrounded by a wall or guard $e$. A suitable friction-brake $b'$ is applied in a well-known manner. On the floor of this second vehicle, entirely inside the plane of the wheels, is a series of battery-cells, preferably arranged in trays or long boxes $a$, having suitable covers, twelve cells being a convenient number for each box or tray. Three of these boxes are placed side by side on the floor $h$, and upon each of these are superposed three other similar boxes $a'\ a^2\ a^3$, making a superposed series of four tiers—three boxes in each tier—the number of cells aggregating one hundred and forty-four. The vehicle V is linked or mechanically connected to the car C by a connection $n$, and the motors on the car C are connected with the batteries on vehicle V by an electrical circuit through the medium of a flexible connection $f$, electrically uniting car C and vehicle V.

The connection of the circuit with respect to the motors $m\ m'$, the batteries $a\ a'$, &c., and the switching apparatus R and $s$ is shown in Fig. 3. The switch $s$ consists of a series of fixed contact-points connected to different points in the series of cells. The extreme terminals $p$ are connected to the opposite ends of the entire series of cells, respectively, by wires 4 and 7. The entire series of one hundred and forty-four cells are in two equal divisions, and the divided terminals are connected to the next two adjacent fixed terminals $p'$ by wires 5 and 6. The two central fixed terminals are connected to opposite ends of the motor-circuit 8 and 9. The cylindrical rotating surface of the switch $s$ is shown produced and bears three rows of contacts $c\ c'\ c^2$. When the row of contacts $c$ is in contact with terminals $p$, the motors are connected with the entire number of cells in series. When the row of contacts $c'$ is in contact with terminals $p$, the motors are connected with one-half the entire number of cells in series. When the row of contacts $c^2$ is in contact with terminal $p$, the motors are connected with two parallel series of batteries, each series being one-half the entire series.

The motors are series wound, and the armature-coils are connected to two movable contacts of a reversing-switch R by wires 100 and 101. Fixed contacts, forming part of switch R, are connected to opposite ends of the divided circuit 8 9. By operating switch R the current flowing in circuit 8 9 has its direction reversed through that portion of the car-circuit 100 and 101 containing the armature-coils of the motors, whereby the direction of movement of the motors is reversed at the will of the operator, the polarity of the field and armature coils with respect to each other being reversed.

The operation of this apparatus is evident from the foregoing description. The battery located on the vehicle V is charged by a dynamo at the station. The vehicle V is then rolled out and attached to the car. During its trip a second similar vehicle, bearing a similar series of cells, has such shells charged, and upon the return of the first vehicle V with discharged cells the second is substituted for it without handling the batteries or producing any change except the breaking of the electrical and mechanical connection with one vehicle V, and making such connection with the substituted vehicle. Time and labor are saved, the expense of operation is decreased, the useful life of the battery is prolonged by avoiding the jars incident to handling, and the delay at a terminal heretofore incident to the necessary change is avoided.

What I claim, and desire to secure by Letters Patent, is—

1. The combination of a wheeled vehicle having seats for passengers, one or more electric motors located on said vehicle and mechanically connected with a wheel or axle thereof, a second wheeled vehicle mechanically connected with the first vehicle, a series of secondary batteries or accumulators located thereon, an electric circuit uniting the motors on one vehicle with the batteries on the other, and a switch or circuit-changer for varying the connection of the batteries with respect to said circuit, substantially as described.

2. The combination of a wheeled vehicle having seats for passengers, means for propelling said vehicle, consisting of one or more electric motors located thereon and mechanically connected with a wheel or axle thereof, a second wheeled vehicle mechanically connected with the first and moved thereby, a series of cells of battery located upon the second vehicle, an electric circuit uniting the batteries on one vehicle with the motors on the other, and suitable switches for varying the connection between said circuit and the motor and batteries, substantially as described.

3. The combination of a wheeled vehicle having seats for passengers, means for propelling said vehicle, consisting of one or more electric motors located thereon and mechanically connected with a wheel or axle thereof, a second wheeled vehicle connected with the first and moved thereby, superposed rows of cells of secondary battery located upon said second vehicle inside the plane of the wheels, an electrical circuit uniting the batteries on one vehicle with the motors on the second, and one or more switches for varying the connection between the said circuit and the batteries and motors, substantially as described.

4. The combination of a vehicle having four or more wheels, suitable bearings or axles therefor, means for propelling said vehicle, consisting of two electric motors located thereon and mechanically connected to the wheels or axles, respectively, seats for passengers upon said vehicles, a second wheeled vehicle mechanically connected with the first vehicle and moved thereby, a series of cells of secondary battery located thereon, an electric circuit uniting the motors on one vehicle with the batteries on the other, and a switch or circuit-changer for varying the connection between said circuit and the motors and batteries, substantially as described.

5. The combination of a vehicle having four or more wheels, suitable bearings or axles therefor, means for propelling said vehicle, consisting of two electric motors located thereon and mechanically connected to the wheels or axles, respectively, seats for passengers upon said vehicle, a second wheeled vehicle mechanically connected with the first vehicle and moved thereby, a series of cells of secondary battery located upon said vehicle in superposed rows, an electrical circuit uniting the motors on one vehicle with the batteries on the other, and a switch or circuit-changer for varying the connection between said circuit and the motors and batteries, substantially as described.

6. The combination of a wheeled vehicle having seats for passengers and entrances thereto from opposite ends, one or more series-wound electric motors located on said vehicle and mechanically connected with a wheel or axle thereof, a second wheeled vehicle mechanically connected with the first vehicle and moved thereby and therewith, a series of cells of secondary battery located thereon, an electric circuit uniting the motors on one vehicle with the batteries on the other, and a switch or circuit-changer for varying the connection of the circuit, batteries, and motors with respect to each other, substantially as described.

7. The combination of a wheeled vehicle, one or more series-wound electric motors located on said vehicle and mechanically connected with a wheel or axle thereof, a second wheeled vehicle mechanically connected with the first vehicle and moved thereby and therewith, a series of cells of secondary battery located on said second vehicle, an electrical circuit uniting the motors on one vehicle with the batteries on the other through the medium of a flexible electrical connection between the two said vehicles, and suitable switching apparatus for varying the connection of said circuit with respect to the batteries and motors, substantially as described.

8. The combination of a wheeled vehicle having seats for passengers and entrances at opposite ends, one or more electric motors located thereon and mechanically connected with a wheel or axle thereof, a second wheeled vehicle mechanically connected with the first vehicle and moved thereby and therewith, a series of cells of secondary battery located thereon, an electric circuit uniting the motors on one vehicle with the batteries on the other, and suitable switching apparatus for varying the number of cells in circuit for connecting said cells in parallel and for reversing the polarity of the motor, field, and armature coils with respect to each other, substantially as described.

Signed at New York city, in the county of New York and State of New York, this 4th day of April, A. D. 1889.

WILLIAM W. GRISCOM.

Witnesses:
DANIEL E. DELAVAN,
V. E. SCHAUMBURG.